United States Patent
Schiche et al.

(10) Patent No.: US 10,633,133 B2
(45) Date of Patent: Apr. 28, 2020

(54) FORMING STATION FOR A THERMOFORM PACKAGING MACHINE

(71) Applicant: MULTIVAC Sepp Haggenmüller SE & Co. KG, Wolfertschwenden (DE)

(72) Inventors: Hans-Christian Schiche, Buxheim (DE); Bastian Grondinger, Dietmannsried (DE)

(73) Assignee: Multivac Sepp Haggenmüller SE & Co. KG, Wolfertschwenden (DE)

( * ) Notice: Subject to any disclaimer, the term of this patent is extended or adjusted under 35 U.S.C. 154(b) by 404 days.

(21) Appl. No.: 15/402,983

(22) Filed: Jan. 10, 2017

(65) Prior Publication Data
US 2017/0197746 A1 Jul. 13, 2017

(30) Foreign Application Priority Data

Jan. 12, 2016 (EP) .................................... 16150844

(51) Int. Cl.
| | |
|---|---|
| *B29C 51/00* | (2006.01) |
| *B29C 51/18* | (2006.01) |
| *B29C 51/20* | (2006.01) |
| *B29C 51/26* | (2006.01) |
| *B26F 1/44* | (2006.01) |
| *B26D 7/26* | (2006.01) |
| *B65B 47/02* | (2006.01) |
| *B65B 59/04* | (2006.01) |

(Continued)

(52) U.S. Cl.
CPC ............ *B65B 47/02* (2013.01); *B29C 51/082* (2013.01); *B29C 51/20* (2013.01); *B29C 51/265* (2013.01); *B29C 51/32* (2013.01); *B65B 47/04* (2013.01); *B65B 47/10* (2013.01); *B65B 59/04* (2013.01); *B65B 61/02* (2013.01); *B29C 51/10* (2013.01); *B29C 2793/0018* (2013.01); *B65B 9/04* (2013.01); *B65B 31/028* (2013.01); *B65B 47/08* (2013.01)

(58) Field of Classification Search
None
See application file for complete search history.

(56) References Cited

U.S. PATENT DOCUMENTS 3,377,658 A * 4/1968 Wilhoit .................. B29C 37/02
425/292
4,299,151 A * 11/1981 Burton .................. B26D 1/605
83/300

(Continued)

FOREIGN PATENT DOCUMENTS

| CN | 101347942 A | 1/2009 |
|---|---|---|
| CN | 201220432 Y | 4/2009 |

(Continued)

*Primary Examiner* — Jacob T Minskey
*Assistant Examiner* — Baileigh Kate Darnell
(74) *Attorney, Agent, or Firm* — Husch Blackwell LLP (57) ABSTRACT

A forming station for a thermoform packaging machine, wherein the forming station comprises a forming tool upper part and a forming tool lower part that are each configured for cooperating so as to thermoform a film positioned between the forming tool lower part and the forming tool upper part. The forming station includes a first change bar that is adapted to be releasably attached to a reception area of the forming tool lower part and the first change bar carries a plurality of punches or blades.

21 Claims, 5 Drawing Sheets

(51) Int. Cl.
  *B65B 47/04* (2006.01)
  *B29C 51/08* (2006.01)
  *B29C 51/32* (2006.01)
  *B65B 47/10* (2006.01)
  *B65B 61/02* (2006.01)
  *B29C 51/10* (2006.01)
  *B65B 47/08* (2006.01)
  *B65B 31/02* (2006.01)
  *B65B 9/04* (2006.01)

(56) References Cited

U.S. PATENT DOCUMENTS

| | | | |
|---|---|---|---|
| 5,393,474 A | 2/1995 | Souders | |
| 2004/0016205 A1* | 1/2004 | Douglas | B65B 61/188 |
| | | | 53/133.4 |
| 2012/0108408 A1* | 5/2012 | Schiche | B65B 61/065 |
| | | | 493/189 |

FOREIGN PATENT DOCUMENTS

| | | |
|---|---|---|
| CN | 201471526 U | 5/2010 |
| CN | 102233961 A | 11/2011 |
| CN | 102530287 A | 7/2012 |
| DE | 3935625 A1 | 5/1991 |
| FR | 2994122 A1 | 2/2014 |
| JP | 11254395 A | 9/1999 |
| JP | 4019673 B2 | 12/2007 |
| JP | 2015188966 A | 11/2015 |

* cited by examiner

FORMING STATION FOR A THERMOFORM PACKAGING MACHINE

CROSS-REFERENCE TO RELATED APPLICATIONS

This application claims priority to European Patent Application Number 16150844.5 filed Jan. 12, 2016, to Hans-Christian Schiche, et al., currently pending, the entire disclosure of which is incorporated herein by reference.

FIELD OF THE INVENTION

The present invention relates to the field of packaging machines. In particular, the present invention relates to a forming station for a thermoform packaging machine.

BACKGROUND OF THE INVENTION

Thermoform packaging machines may include a forming station that forms one or a plurality of connected packaging troughs in a bottom film by thermoforming. Subsequently, the packaging troughs are filled with products to be packed, e.g. with foodstuffs, and closed (sealed) in a sealing station with a top film. Especially in the field of food packaging, it is common practice to extract (evacuate) the atmospheric air from the filled package and to supply to the packages a suitable (protective) gas prior to sealing the package. When a suitable gas is chosen, then the shelf life of the foodstuffs can be increased.

DE 10 2007 047 058 A1 discloses that an edge area of the bottom film that includes openings through which atmospheric air can be extracted from the spatial areas located between the packaging troughs and the top film prior to sealing in the sealing station. Prior to sealing, the packages have been supplied a suitable gas through additional openings in the bottom film.

DE 1997 665 U discloses a thermoform packaging machine with a forming station, wherein the forming station includes a thermoforming tool comprising a forming tool upper part and a forming tool lower part for forming packaging troughs in a bottom film. The thermoforming tool comprises a blade for cutting slits into the bottom film parallel to the feed direction of the bottom film. Through said slits, the packages can then be evacuated in a downstream sealing station.

SUMMARY OF THE INVENTION

It is an object of the present invention to provide for a thermoform packaging machine a forming station that can quickly and easily be serviced and prepared for use.

A forming station for a thermoform packaging machine according to the invention comprises a forming tool upper part and a forming tool lower part. The forming tool upper and lower parts are configured for cooperating so as to thermoform a film, in particular a plastic film, positioned between the forming tool lower part and the forming tool upper part. In one embodiment, the forming station may be configured for forming packaging troughs in the film. To this end, respective die parts corresponding to the desired shape of the packaging troughs may be insertable into the forming tool upper part and/or the forming tool lower part. For thermoforming, the forming tool upper part and the forming tool lower part can then be moved towards one another, so that the film positioned therebetween will assume a shape corresponding to the die parts upon thermoforming. Alternatively or additionally, the film may have applied thereto pressurized air or a vacuum from the forming tool upper part or the forming tool lower part so as to make the film cling to the die parts.

According to the present invention, a change bar is provided in the forming station, wherein the change bar carries a plurality of punches or a plurality of blades. In one embodiment, the change bar carries curved blades. The change bar may be adapted to be releasably secured to a reception area of the forming tool lower part. The punches or blades may be configured to perforate or slit the film during thermoforming and to provide openings, wherein the openings are used in a subsequent processing step, but prior to sealing of the packages, to allow the packages to be evacuated and/or filled with gas.

The change bar according to the present invention allows the punches or blades to be exchanged easily and quickly in order to retool the forming station for changing over to a different geometrical arrangement of the punches or blades, in the case of wear of the punches or blades, or for changing over to a different kind of cutting (e.g. from punches to blades). In one embodiment, changing the change bar can be effected by releasing the change bar and replacing it with a new change bar. This may minimize the downtime of the respective thermoform packaging machine. In addition, the position of the punches or the blades relative to one another may already be determined by their position on the change bar and, in some embodiments, may be adjusted precisely. Moreover, by attaching or removing the change bar, the forming station can be changed over quickly and easily, according to requirements, between an operating mode in which slits or holes are cut into the film during thermoforming, and an operating mode in which no such cutting of slits or holes takes place.

In order to simplify the description of the present invention, the forming tool parts of the forming station are referred to as "forming tool upper part" and "forming tool lower part". This, however, does not mean that a specific spatial orientation of the forming station is predetermined. For example, it is definitely imaginable that the forming tool lower part is arranged above the forming tool upper part. Hence, it is also imaginable that the reception area for attaching the change bar is provided on a forming tool part constituting the upper part. However, the reception area should preferably be provided on the forming tool part constituting the lower part.

When a change bar with blades is used, slits may be cut into the film. A change bar provided with punches may be configured for cutting holes into the film. It is, however, also imaginable to cut only slits into the film, when a change bar provided with punches is used. The punches that may be used for this purpose may have a contour which exhibits a non-constant height profile with respect to the direction in which the forming tool lower part and the forming tool upper part are spaced apart. It follows that, when a suitable height profile of the (respective) contours of the punches is chosen, only a part of the respective contour can actually contribute to the cutting of the film, so that the film will not be perforated but slit. During slitting, non-linear cuts are preferably formed in the film, so that the film has formed therein flaps, which are movable in a hinge-like manner, so as to expose openings in the film. This cutting of nonlinear cuts may be accomplished by curved blades or punches with contours exhibiting a non-constant height profile.

In particular, the change bar may be attachable to the reception area of the forming tool lower part such that it is vertically adjustable relative to the forming tool lower part, so that the penetration depth of the punches or blades into the film can be adjusted. The level on which the change bar is attached may be adjustable by of adjusting screws and/or the number or size of washers. In particular, the change bar may be vertically adjustable on the reception area, with one embodiment providing vertical adjustment over a maximum range of two (2) millimeters (mm). Other ranges of adjustment may be within the scope of the present invention. When punches with contours exhibiting a non-linear height profile are used, it is possible to adjust, by means of a vertical adjustment of the change bar, which parts of the contours of the punches will contribute to the cutting of the film, so that the shape of the respective cuts can be predetermined.

The reception area for the change bar may be provided laterally on the forming tool lower part. This makes the reception area particularly easily accessible. It is also imaginable that reception areas are provided on both sides of the forming tool lower part. In this case, a second change bar may be provided for releasable attachment to the second reception area, so as to perforate or slit the film symmetrically.

It is also imaginable that a plurality of, in particular two, change bars, which each carry punches or blades, are releasably attachable in succession to the reception area of the forming station. Differences existing for example in the film length to be perforated or to be slit during a thermoforming process can thus easily be implemented by attaching or omitting the additional change bar.

The releasable fastening of the change bar to the reception area may be executed by screw-fastening. However, the change bar may releasably be fastened to the reception area also in some other way. For example, it is imaginable to fasten the change bar magnetically to the reception area, or to provide a releasable clip connection.

Depending on the respective structural design of the forming station, it may be expedient when the reception area is movable relative to the rest of the forming tool lower part in the direction of the forming tool upper part. The change bar attached to the reception area can thus be moved actively towards the film for perforating or slitting the film with the punches or for slitting the film with the blades. After such perforation or slitting, the change bar can be moved away from the film so as to allow the film to be advanced and conveyed out of the forming station.

The plurality of punches or blades may be installed on a change bar such that they are integral therewith. For example, the punches or blades may have been cast-in in a casting process during the production of the change bar from a plastic material or metal. Integrally installed punches or blades are fixed in position in a particularly stable manner and provide good and reproducible results when the film is being perforated or slit.

It is also imaginable that the punches or blades are releasably fastened to the change bar. To this end, the change bar may have provided thereon a fastening site for each punch or for each blade. The punches or blades may be removed from the change bar for servicing, in particular for sharpening, and may be re-installed later on or replaced by other punches or blades at least temporarily. The punches or blades may be screw-fastened to the fastening sites of the change bar. The fastening sites may be configured as openings, which are provided in the change bar and into which the punches or the blades can be inserted. In particular punches, but also blades, can easily be secured in position by inserting them into openings in the change bar and by subsequently fastening them in the respective opening by means of locking screws or other component fastener known in the art.

The change bar may have provided therein a plurality of exchange passages, which each communicate with a change bar opening accommodating a respective punch. By means of a tool that can be inserted into the exchange passage in question, the respective punch can then be pushed out of the change bar, so that the punches of the change bar can easily be replaced.

In order to facilitate punching or slitting of the film, a recess area of the forming tool upper part may have provided therein a plurality of recesses such that, during thermoforming of the film, the punches or blades will engage the recesses. In particular, each punch or blade may have associated therewith a recess. It is, however, also imaginable that the recess area of the forming tool upper part has provided therein only one recess, which is engaged by all the punches or blades of the change bar during thermoforming of the film. It is also imaginable to provide a plurality of recesses such that, during thermoforming, one respective punch or a plurality of punches, or one respective blade or a plurality of blades, engages a recess.

The forming tool lower part may be provided with a plurality of guide indentations, each of the punches or blades being at least partially accommodated in a respective guide indentation in the attached condition of the change bar. The guide indentations may be concave areas of the forming tool lower part. In particular, each punch or each blade may be accommodated in a guide indentation associated therewith. The guide indentations stabilize the attached positions of the punches or of the blades and increase thus the positioning accuracy with which the film is perforated or slit.

A plurality of change bars may be kept available, so as to be able to quickly exchange, according to requirements, the change bar used at the time in question. Keeping available a plurality of identical change bars allows a rapid replacement of the punches or of the blades in the case of wear. However, it is also imaginable to keep differently configured change bars available, so as to allow a rapid changeover of the operating mode. The change bars may e.g. differ as regards the geometrical arrangement of the fastening sites for the punches or the blades. If a thermoforming process is to be performed without perforating or slitting the film, the change bar may be omitted. Depending on the structural design of the forming station, this may, however, render ineffective a seal that may possibly be intended to rest on the change bar. Hence, it may be expedient to provide a dummy bar without any punches or blades. This dummy bar may be attached instead of a change bar, in the event that the film is not intended to be perforated or slit, and cooperate with a seal of the forming station.

It turned out that, depending on the nature and the characteristics of the film, the use of punches or blades may produce better results that the use of the other. Therefore, it may especially be advantageous to provide two change bars, which are adapted to be alternatively attached to the reception area of the forming tool lower part in a releasable manner. A first change bar may be provided with a plurality of punches and a second change bar may be provided with a plurality of blades. The forming station can thus quickly be changed over from punches to blades, if e.g. a different kind of film should be used.

It will be particularly advantageous when only the change bars have to be replaced for changing over from punches to blades or from blades to punches. This can be achieved in that, in the recess area of the forming tool upper part, the plurality of recesses is provided such that, during thermoforming of the film in the attached condition of the first change bar (with punches), the punches will engage the recesses so as to perforate or slit the film, and, during thermoforming of the film in the attached condition of the second change bar (with blades), the blades will engage the (same) recesses so as to slit the film. Alternatively or additionally, the guide indentations of the forming tool lower part may be configured such that, in the attached condition of the first change bar (with punches), each of the punches will at least partially be accommodated in a respective guide indentation, and, in the attached condition of the second change bar (with blades), each of the blades will at least partially be accommodated in a respective guide indentation.

Preferably, the contours of the blades of the second change bar are adapted to the contours of the punches of the first change bar. Also in this way, it is achieved that, with the exception of the replacement of the change bars, no changes or the least possible number of additional changes have to be made at the forming station for changing over from punches to blades or from blades to punches.

In particular, a length of the punches (relating to one punch) in the direction of extension of the change bar may correspond substantially to a length of the blades (relating to one blade) in the direction of extension of the change bar. The length of the punches of the first change bar may correspond to the length of the blades of the second change bar, in particular except for a maximum deviation of 10% of the greater length. On the one hand, this will guarantee that the first change bar and the second change bar both fit in with the recesses of the forming tool upper part and the guide indentations of the forming tool lower part. On the other hand, it can be guaranteed that films processed with the first change bar can be subjected to further processing in the same sealing station as films processed with the second change bar. In this respect, it will also be of advantage when the distance between the punches of the first change bar substantially corresponds to the distance between the blades of the second change bar, when seen in the longitudinal direction of the change bar. In one embodiment, the distance between two neighboring punches of the first change bar may deviate from the distance between neighboring blades of the second change bar by not more than 10% of the larger distance. To this end, the respective largest distance between two neighboring punches of the first change bar may be compared with the largest distance between two neighboring blades of the second change bar.

It may also be particularly advantageous when the contours of the blades of the second change bar fully correspond to a part of the contours of the punches of the first change bar.

Likewise, it may be of advantage when the contours of the blades of the second change bar will not extend beyond areas delimited by contours of the punches of the first change bar. Thus, a forming station that was originally configured for use with the punches of the first change bar can also be used with the blades of the second change bar.

The present invention also relates to a thermoform packaging machine comprising a forming station according to the present invention. As described above, the forming station forms packaging troughs in a bottom film through thermoforming. Evacuation openings are cut-in by means of the punches or the blades. The thermoform packaging machine may additionally comprise a conveyor, using methods known in the art or hereafter developed, which conveys the bottom film from the forming station to a sealing station of the thermoform packaging machine. There, the packaging troughs, which have been filled in the meantime, are covered with a top film, whereupon atmospheric air is extracted from the package through the evacuation openings and gas is introduced, if desired. Following this, the bottom film and the top film may be connected to one another, e.g. by ultrasonic welding or other known sealing method. The thermoform packaging machine may additionally comprise a cutting device for separating the individual packages from one another.

Other aspects and advantages of the present invention will be apparent from the following detailed description of the preferred embodiments and the accompanying drawing figures.

DESCRIPTION OF THE SEVERAL VIEWS OF THE DRAWING

In the following, the present invention will be explained with reference to embodiments on the basis of the enclosed drawings, in which.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 1:
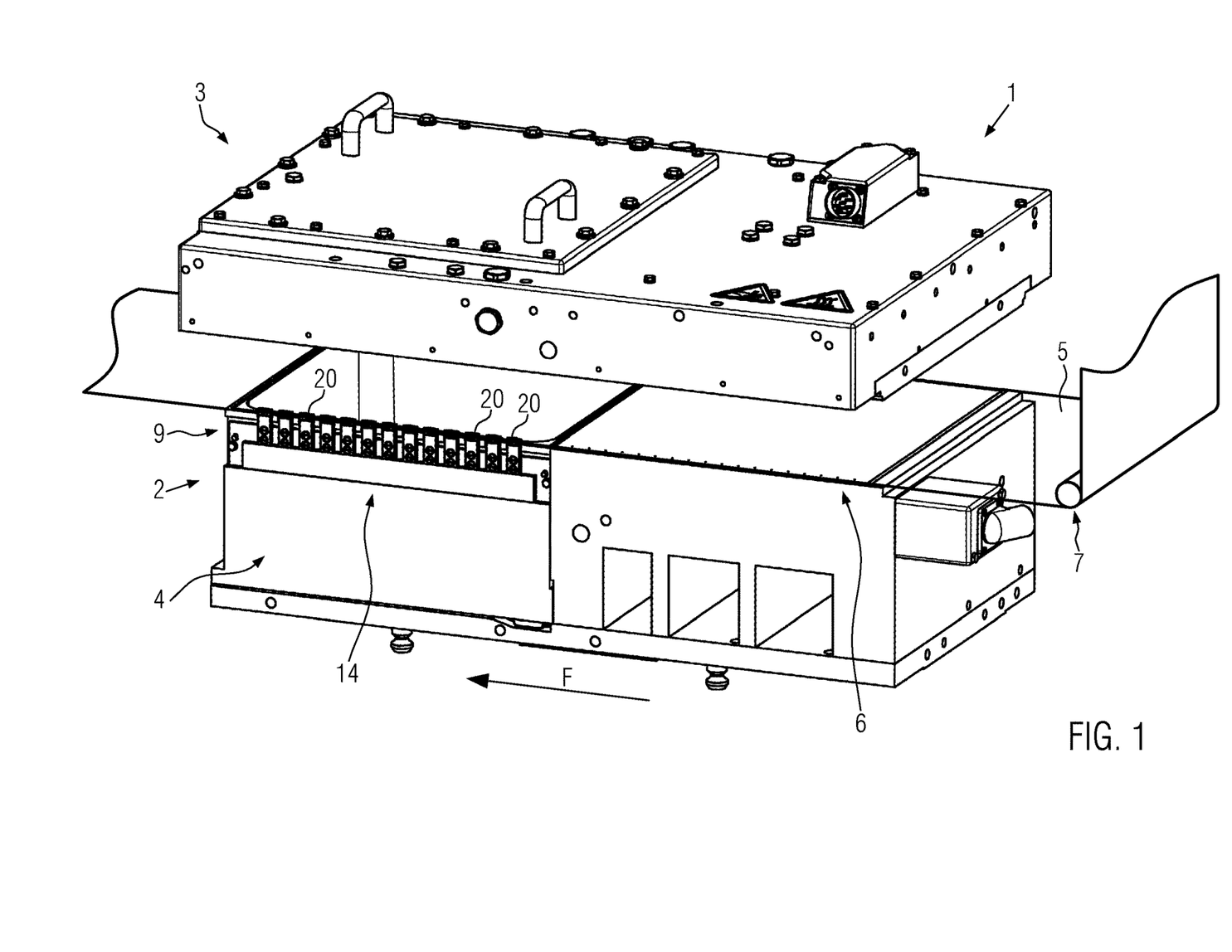
FIG. 1 shows a schematic representation of a detail of a thermoform packaging machine with a forming station according to an embodiment.

FIG. 1 shows a perspective view of a detail of a thermoform packaging machine 1 with a forming station 2 according to an embodiment. The forming station 2 comprises a forming tool upper part 3 and a forming tool lower part 4, which are configured to cooperate for thermoforming a film 5 positioned between the forming tool lower part 4 and the forming tool upper part 3. During operation, the forming station 2 forms packaging troughs into the film 5 by thermoforming. To this end, the forming tool lower part 4 may have provided therein respective die parts (not shown) corresponding to the desired shape of the packaging troughs. Thermoforming of the film 5 can be carried out in a purely mechanical manner in that the die parts in the forming tool lower part 4 cooperate with complementary male die parts (not shown) in the forming tool upper part 3. Alternatively or additionally, the film 5 may be forced into the die parts of the forming tool lower part 4 by means of pressurized air from the forming tool upper part 3 and/or may be sucked into the die parts by means of a negative pressure in the forming tool lower part 4.

In order to make the film 5 moldable, it can be heated by means of a heating device 6 of the thermoform packaging machine 1 prior to thermoforming. By means of a conveyor 7 (partially shown) of the thermoform packaging machine 1, the film 5 is moved from the heating device 6 along a conveying direction F into the forming station 2. After thermoforming, the packaging troughs can be filled with products to be packed. The film with the filled packaging troughs can then be advanced to a sealing station (not shown), where, after evacuation and, preferably, gas-flushing of the packages with a protective gas, the packaging troughs are sealed with a top film and thus closed.

In order to be able to cut openings that allow the evacuation and gas-flushing of the packages into the film 5, the embodiment shown in FIG. 1 has releasably attached thereto a change bar 14 in a reception area 9 of the forming tool lower part 4, said change bar 14 carrying a plurality of blades 20. In the embodiment shown, the reception area 9 is provided laterally on the forming tool lower part 4.

Figure 2:
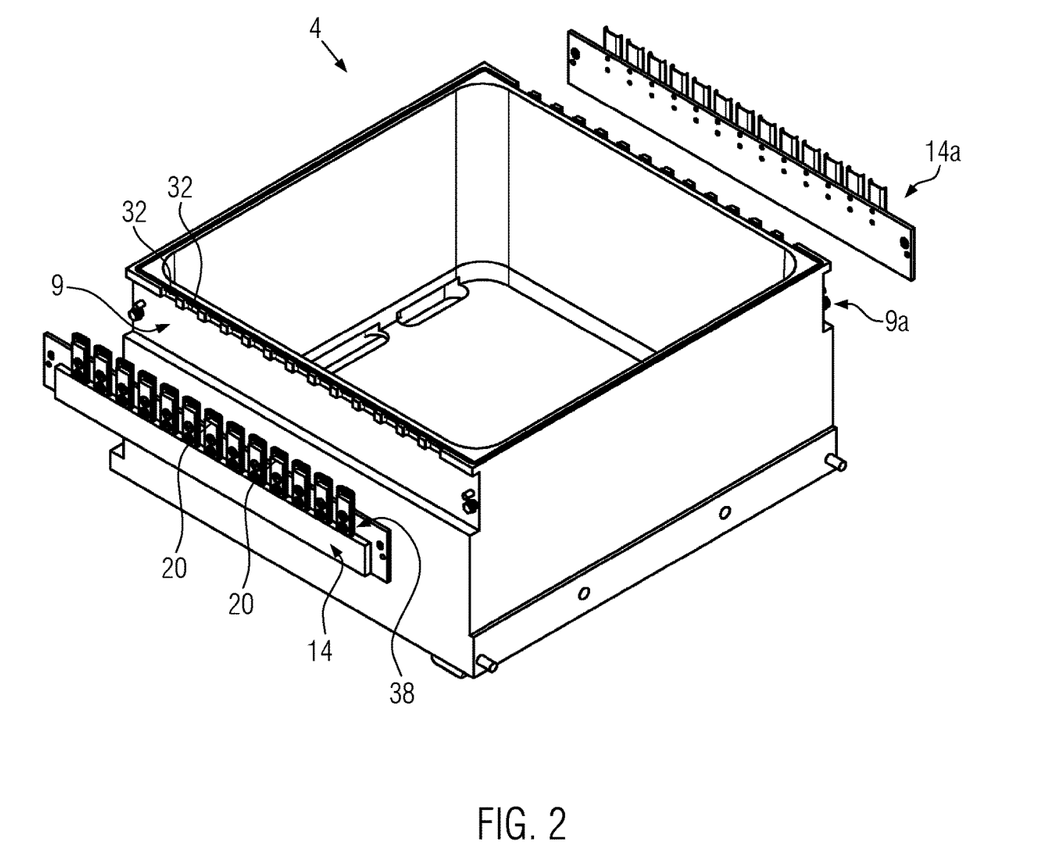
FIG. 2 shows a schematic representation of the forming tool lower part of the forming station with attachable change bars according to the embodiment shown in FIG. 1.

FIG. 2 shows the forming tool lower part 4 according to FIG. 1 after the change bar 14 has been removed from the reception area 9. As can be seen here, a further reception area 9a, which is adapted to have releasably attached thereto a further change bar 14a, is provided on the side of the forming tool lower part 4 located opposite to the reception area 9 according to the embodiment shown. In the following, only one of the reception areas 9 and the change bars 12, 14 associated therewith will be discussed. The optionally provided second reception area 9a with the change bars 14a associated therewith may be configured analogously. As shown in FIGS. 1 and 2, the change bar 14 can releasably be attached to the forming tool lower part 4 via a screw connection. It is, however, also imaginable to releasably attach the change bar 14 to the forming tool lower part 4 in some other way, e.g. magnetically or via a releasable clip connection.

Figure 3:
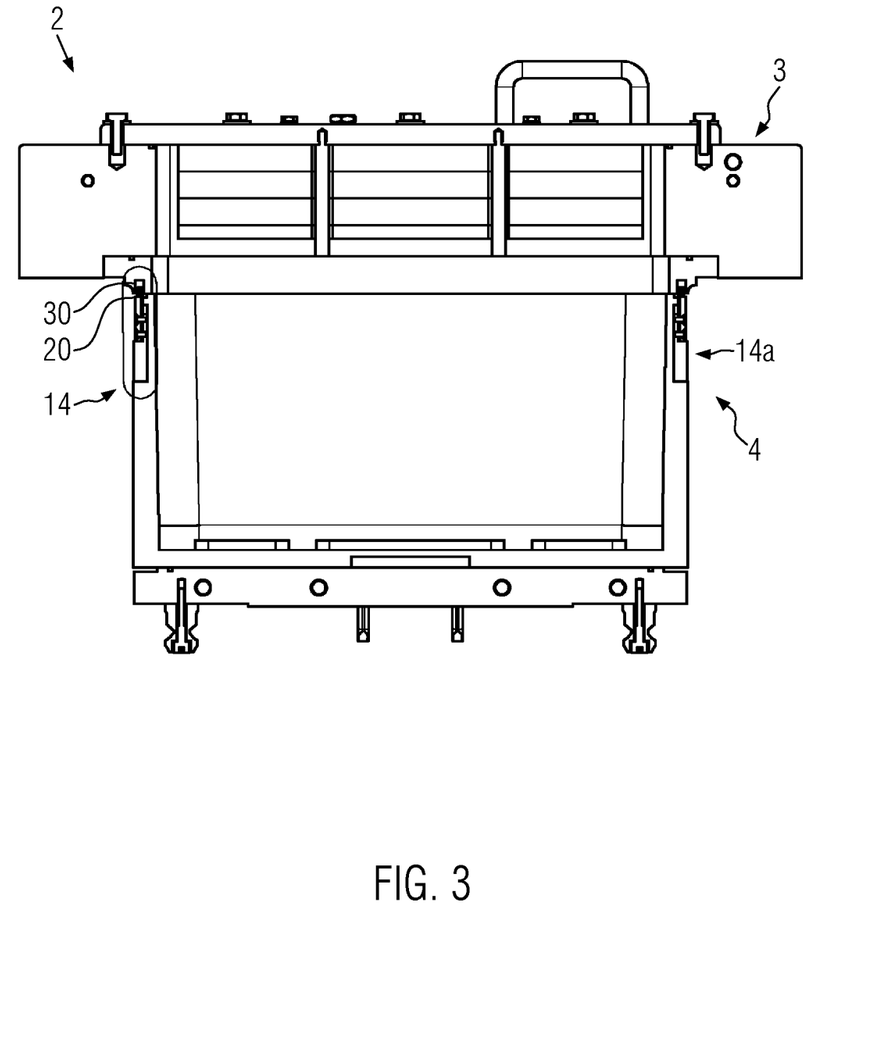
FIG. 3 shows a schematic sectional view through the forming station with attached change bars according to the embodiment shown in FIG. 1.

FIG. 3 shows a schematic sectional view through the forming station 2 shown in FIG. 1, the sectional plane being perpendicular to the conveying direction F. In FIG. 3, the forming tool lower part 4 and the forming tool upper part 3 occupy relative to one another the position at which they are located during thermoforming of the film 5. As especially be seen from the detail of FIG. 3 shown in FIG. 4A, the blades 20 of the change bar 14 each engage, during thermoforming of the film 5, a respective one of a plurality of recesses 30 of a recess area of the forming tool upper part 3, so that the film 5 will be slit. The recesses 30 are, analogously to the arrangement of the blades 20, arranged in succession in the conveying direction F.

Figure 4A:
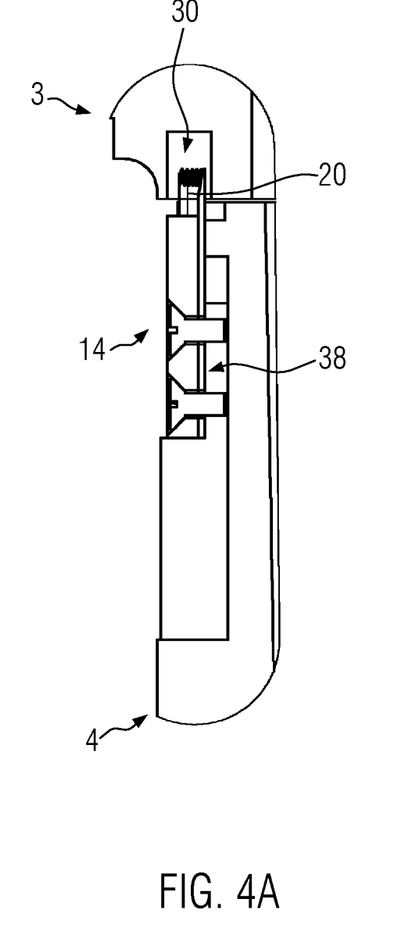
FIG. 4A shows a detail of a schematic sectional view of the forming station in the attached condition of a change bar with blades according to the embodiment of FIG. 1.
Figure 4B:
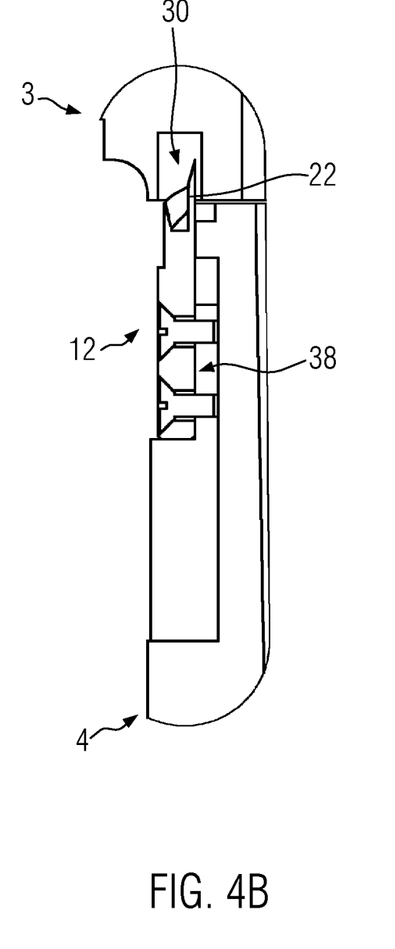
FIG. 4B shows a detail of a schematic sectional view of the forming station in the attached condition of a change bar with punches according to the embodiment of FIG. 1.
Figure 6:
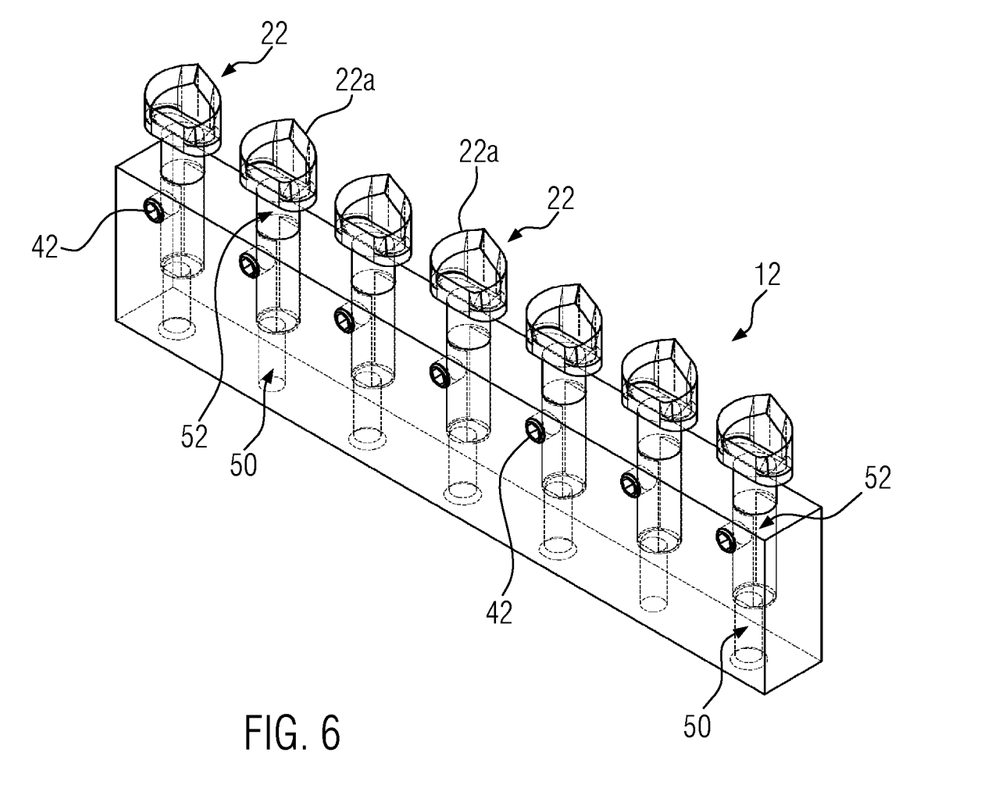
FIG. 6 shows a schematic perspective view of a change bar of a forming station according to an embodiment with punches.

In the embodiment shown, the forming station 2 comprises, in addition to the change bar 14 with blades 20 shown in FIGS. 1, 2, 3 and 4A, a change bar 12 with punches 22 shown in FIG. 4B (and with an alternative shape of the punches 22 in FIG. 6). Also the punches 22 are configured for forming evacuation openings in the film 5 during thermoforming. Depending on the respective conditions of use (e.g. the film used or the kind of packaging used), the change bar 12 with the punches 22 (in the following "first change bar 12") or, alternatively, the change bar 14 with the blades 20 (in the following "second change bar 14") may releasably be attached to the reception area 9 of the forming tool lower part 4. The provision of the punches 22 and of the blades 20, respectively, on the change bars 12, 14 allows the punches 22 and the blades 20, respectively, to be exchanged quickly and easily in one working step by replacing the change bar 12, 14 by a new change bar 12, 14, whereby the forming station 2 can be serviced more easily. Moreover, the forming station 2 can be changed over between two successive uses quickly and easily from blades 20 to punches 22 (by replacing a second change bar 14 by a first change bar 12) or from punches 22 to blades 20 (by replacing a first change bar 12 by a second change bar 14).

However, it would also be imaginable to provide additional change bars 12, 14 so as to replace worn blades 20 or punches 22, or change bars 12, 14 with different geometrical arrangements of punches 22 or blades 20, which can be exchanged, e.g. in the event that the packaging format changes. It would also be imaginable to provide only one or a plurality of, in particular identical, first change bars 12 (with punches 22) or one or a plurality of, in particular identical, second change bars 14 (with blades 20), if the forming station 2 is operated exclusively with blades 20 or exclusively with punches 22. Also in this case, the advantage of easy servicing is preserved.

It will be particularly advantageous when a change between a first change bar 12 and a second change bar 14 does not necessitate any further adaptations at the forming station 2. FIG. 4B shows a sectional view, which is analogous to that shown in FIG. 4A, at a thermoforming position of the forming tool parts 3, 4. The second change bar 14 according to FIG. 4A (with blades 20) has here been replaced by a first change bar 12 (with punches 22). As can easily be seen, also the punches 22 engage the recesses 30 of the forming tool upper part 3 during thermoforming of the film 5. Since, according to the embodiment shown, the recesses 30 of the forming tool upper part 3 are suitably shaped, they are well adapted to be used with both the punches 22 of the first change bar 12 as well as with the blades 20 of the second change bar 14.

As can especially be seen from FIG. 2, the forming tool lower part 4 of the embodiments shown may be provided with a plurality of guide indentations 32, so that, in the attached condition of the second change bar 14, each of the blades 20 of the second change bar 14 will partially be accommodated in a respective guide indentation 32 associated therewith. Positioning the change bar 14 is thus facilitated and the blades 20 are stabilized at their installed position. In addition, the guide indentations 32 are shaped such that, when the first change bar 12 is attached to the reception area 9 of the forming tool lower part 4, one or more (to all) of the punches 22 is at least partially accommodated in a respective guide indentation 32 associated therewith.

In order to make the forming station 2, in particular the recesses 30 of the forming tool upper part 3 and the guide indentations 32 of the forming tool lower part 4, compatible with the punches 22 of the first change bar 12 as well as with the blades 20 of the second change bar 14, it will be advantageous to adapt the contours 20a of the blades 20 of the second change bar 14 to the contours 22a of the punches 22 of the first change bar 12.

Figure 5A:
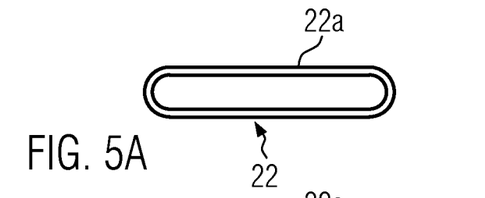
FIG. 5A shows a schematic top view of the contour of a punch of a change bar of a forming station.
Figure 5B:
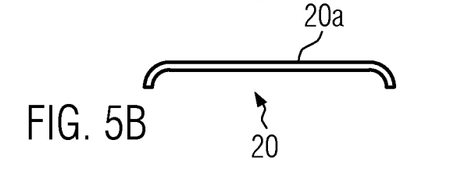
FIG. 5B shows a schematic top view of the contour of a blade of a change bar of a forming station.

FIG. 5A shows, in a top view, schematically the contour 22a of a punch 22 of the first change bar 12 according to an embodiment. FIG. 5B shows the associated, adapted contour 20a of a blade 20 of the second change bar 14 of this embodiment. The blade 20 is a curved blade 20 with a curved contour 20a. Preferably, all the punches 22 or all the blades 20 of a change bar 12, 14 have the same contours. In the embodiment according to FIGS. 5A and 5B, the contours 20a of the blades 20 of the second change bar 14 fully correspond to a part of the contours 22a of the punches 22 of the first change bar 12. Thus, the contours 20a, 22a can be adapted very well to one another in an easy manner, so that the first change bar 12 and the second change bar 14 can easily be exchanged for one another.

Alternatively, the punches 22 of the first change bar 12 may also have contours 22a shaped according to the representation shown in FIG. 6, and the blades 20 of the associated second change bar 14 may, like in FIGS. 1 and 2, e.g. have a curved contour 20a (this also corresponds to the blade shape according to FIG. 5B). In this case, the contours 20a of the blades 20 of the second change bar 14 do not extend beyond areas delimited by the contours 22a of the punches 22 of the first change bar 12. The punches 22 according to the embodiment shown in FIG. 6 each have a contour 22a exhibiting a non-constant height profile with respect to the direction in which the forming tool lower part 4 and the forming tool upper part 3 are spaced apart. It follows that, when a suitable height profile of the contours 22a of the punches 22 is chosen, only a part of the respective contour 22a can actually contribute to the cutting of the film 5, so that the film 5 will not be perforated but slit. During slitting, preferably non-linear cuts are formed in the film 5, so that the film 5 has formed therein flaps, which are movable in a hinge-like manner, so as to expose openings in the film 5. This can also be accomplished by curved blades 20.

In the embodiment shown in FIGS. 4A and 4B, the punches 22 or blades 20 are releasably secured to the respective change bar 12, 14. To this end, the change bar 12, 14 may include a fastening site 38 for each punch 22 or for each blade 20. The punches 22 or blades 20 can be removed from the change bar 12, 14 for servicing, in particular for sharpening, and can be re-installed later on or replaced by new punches 22 or blades 20. In the embodiments according to FIG. 1 to 4B, the punches 22 or the blades 20 are screw-fastened to the change bar 12, 14 at the respective fastening site 38. In the embodiment of a first change bar 12 with punches 22 shown in FIG. 6, the fastening sites 38 comprise openings 52 in the change bar 12, into which the punches 22 can be inserted. Via screw holes 42, which communicate with the openings 52 and which may in particular be provided with a thread, the punches 22 can be secured in position in the respective openings 52 by means of locking set screws.

Alternatively, the plurality of punches 22 or blades 20 may be installed on the respective change bar 12, 14 such that they are integral therewith. For example, the punches 22 or the blades 20 may have been cast-in in a casting process during the production of the change bar 12, 14, e.g. from plastic material or metal.

In order to facilitate an exchange of the punches 22, the first change bar 12 of the embodiment shown in FIG. 6 has provided therein a plurality of exchange passages 50, which each communicate with an opening 52 accommodating a respective punch 22. By means of a tool that can be inserted into the exchange passage 50, the respective punch 22 can be pushed out of the first change bar 12 and replaced subsequently by a new punch 22.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A forming station for a thermoform packaging machine comprising:
    a forming tool upper part and a forming tool lower part, the forming tool upper part and the forming tool lower part disposed for cooperating to thermoform a film disposed between the forming tool lower part and the forming tool upper part; and
    a first change bar configured to be removably attached to a reception area of the forming tool lower part and capable to be removed from the reception area of the forming tool lower part, the reception area being provided laterally at the forming tool lower part, wherein said first change bar carries a plurality of punches or a plurality of blades when said first change bar is removed from the reception area of the forming tool lower part and when said change bar is attached to the reception area of the forming tool lower part.

2. The forming station according to claim 1 further comprising a recess area of the forming tool upper part, the recess area having a plurality of recesses disposed to receive the plurality of punches or the plurality of blades during operation to allow the plurality of punches or the plurality of blades to perforate or slit the film during thermoforming of the film.

3. The forming station according to claim 1, wherein the forming tool lower part includes a plurality of guide indentations disposed proximate the reception area, wherein when said first change bar is in an attached condition on said forming tool lower part, each of the plurality of punches or the plurality of blades will at least be partially received into a respective guide indentation.

4. The forming station according to claim 1, wherein the first change bar includes the plurality of punches, and said forming station further includes second change bar adapted to be releasably mounted to the reception area of the forming tool lower part and having a plurality of blades, wherein the second change bar may be mounted to the forming tool lower part as an alternative to the first change bar.

5. The forming station according to claim 4, further comprising a recess area of the forming tool upper part, the recess area having a plurality of recesses disposed to receive the plurality of punches or the plurality of blades during operation to allow the plurality of punches or the plurality of blades to perforate or slit the film during thermoforming of the film.

6. The forming station according to claim 4, wherein the forming tool lower part includes a plurality of guide indentations wherein when said first change bar is in an attached condition on said forming tool lower part, each of the plurality of punches will at least be partially received into a respective one of said plurality of guide indentations, and wherein when said second change bar is in an attached condition on said forming tool lower part, each of the plurality of blades will at least be partially received into a respective one of said plurality of guide indentations.

7. The forming station according to claim 4, wherein the plurality of blades of the second change bar have one or more contours that are similarly arranged to one or more contours of the plurality of punches of the first change bar.

8. The forming station according to claim 4, wherein the plurality blades of the second change bar have one or more contours which fully correspond to one or more contours of the punches of the first change bar.

9. The forming station according to claim 4, wherein one or more contours of the plurality of blades of the second change bar do not extend beyond an area defined by one or more contours of the plurality of punches of the first change bar.

10. The forming station according to claim 4, wherein the first change bar is adapted to be screw-fastened to the reception area, and the second change bar is adapted to be screw-fastened to the reception area.

11. The forming station according to claim 4, wherein each of the plurality of punches are integral with the first change bar, and each of the plurality of blades are integral with the second change bar.

12. The forming station according to claim 4, wherein a vertical position of at least one of the first change bar or the second change bar is adjustable relative to the forming tool lower part.

13. The forming station according to claim 1, wherein the first change bar is screw-fastened to the reception area.

14. The forming station according to claim 1, wherein the reception area is movable in the direction of the forming tool upper part relative to the rest of the forming tool lower part.

15. The forming station according to claim 1, wherein each of the plurality of punches or the plurality of blades is releasably coupled to the first change bar at an associated one of a plurality of fastening sites.

16. The forming station according to claim 1, wherein the first change bar has provided therein a plurality of exchange passages, wherein each of the plurality of exchange passages communicate with a respective opening in said first change bar, wherein each of said respective openings accommodating a punch, and wherein the punches accommodated in said respective openings can be pushed out of the first change bar by a tool sized to be inserted into each of said plurality of exchange passages.

17. The forming station according to claim 1, wherein the plurality of punches or the plurality of blades are integral with the first change bar.

18. The forming station according to claim 1, wherein a vertical position of the first change bar is adjustable relative to the forming tool lower part.

19. A forming station for a thermoform packaging machine comprising:
   a forming tool upper part and a forming tool lower part, the forming tool upper part and the forming tool lower part disposed for cooperating to thermoform a film disposed between the forming tool lower part and the forming tool upper part; and
   a first change bar configured to be removably attached to a reception area of the forming tool lower part, the reception area being provided laterally at the forming tool lower part, wherein said first change bar has a plurality of cutting devices individually coupled to said first change bar in succession along a length of said first change bar and wherein at least two adjacent cutting devices of said plurality of cutting devices coupled to said first change bar define a space therebetween, and wherein each cutting device comprises one of a punch or a blade capable to cut one of an opening or a slit in the film.

20. The forming station according to claim 19, wherein each of the plurality of cutting devices extends in a direction substantially perpendicular to a longitudinal axis of the first change bar.

21. A thermoform packaging machine comprising:
   a forming station for forming one or more packaging troughs in a packaging film;
   a filling station downstream of the forming tool for filling the one or more packaging troughs with a product;
   a sealing station downstream of the filling station, the sealing station capable to evacuate or gas-flush the one or more packaging troughs and seal the one or more packaging troughs with a top film;
   a conveyor for moving the film through the thermoform packaging machine in a conveying direction;
   wherein the forming station includes a forming tool upper part and a forming tool lower part, the forming tool upper part and the forming tool lower part disposed for cooperating to thermoform one or more packaging troughs in the packaging film, wherein the packaging film is disposed between the forming tool lower part and the forming tool upper part; and a first change bar configured to be removably attached to a reception area of the forming tool lower part, the reception area being provided laterally at the forming tool lower part, wherein the first change bar has a plurality of punches or a plurality of blades individually attached to the first change bar along a length of the first change bar, and wherein the plurality of punches or the plurality of blades are disposed to cut an opening or a slit in the film outward of the one or more packaging troughs to allow said sealing station to evacuate or gas-flush said one or more packaging troughs.

* * * * *

UNITED STATES PATENT AND TRADEMARK OFFICE
CERTIFICATE OF CORRECTION

PATENT NO.       : 10,633,133 B2
APPLICATION NO.  : 15/402983
DATED            : April 28, 2020
INVENTOR(S)      : Hans-Christian Schiche et al.

Page 1 of 1

It is certified that error appears in the above-identified patent and that said Letters Patent is hereby corrected as shown below:

In the Claims

Column 11, Lines 4-5, Claim 4:
After "and said forming station further includes"
Insert -- a --.

Column 11, Lines 31-32, Claim 8:
After "wherein the plurality"
Insert -- of --.

Signed and Sealed this
Third Day of November, 2020

Andrei Iancu
*Director of the United States Patent and Trademark Office*